US006252838B1

(12) United States Patent
Kuroda et al.

(10) Patent No.: US 6,252,838 B1
(45) Date of Patent: *Jun. 26, 2001

(54) INFORMATION RECORDING METHOD AND APPARATUS WITH ADDITIONAL RECORDING FUNCTION

(75) Inventors: Kazuo Kuroda; Toshio Suzuki, both of Tokorozawa (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,715

(22) Filed: Apr. 1, 1997

(30) Foreign Application Priority Data

Apr. 1, 1996 (JP) .................................................. 8-079252

(51) Int. Cl.[7] ...................................................... G11B 7/00
(52) U.S. Cl. ................................... 369/47.28; 369/59.23; 369/59.25
(58) Field of Search .................................. 369/54, 58, 32, 369/59, 44.32, 47, 275.3

(56) References Cited

U.S. PATENT DOCUMENTS

| 5,224,087 | * | 6/1993 | Maeda et al. ........................... 369/54 |
|---|---|---|---|
| 5,343,455 | * | 8/1994 | Takeuchi et al. ....................... 369/59 |
| 5,353,276 | * | 10/1994 | Schroder ................................. 369/47 |
| 5,388,105 | * | 2/1995 | Takagi et al. ...................... 369/44.32 |
| 5,404,357 | * | 4/1995 | Ito et al. ............................ 369/44.27 |
| 5,434,991 | * | 7/1995 | Maeda et al. ........................... 369/32 |
| 5,504,728 | * | 4/1996 | Yokota et al. .......................... 369/54 |
| 5,552,896 | * | 9/1996 | Yoshida .............................. 369/275.3 |
| 5,684,765 | * | 11/1997 | Matsumoto et al. .................... 369/54 |
| 5,703,867 | * | 12/1997 | Miyauchi et al. ...................... 369/59 |
| 5,719,886 | * | 2/1998 | Matsui et al. .......................... 369/32 |
| 5,729,525 | * | 3/1998 | Ishida et al. ........................... 369/32 |
| 5,774,434 | * | 6/1998 | Arataki et al. ......................... 369/47 |
| 5,841,748 | * | 11/1998 | Yamamuro ............................. 369/48 |

FOREIGN PATENT DOCUMENTS

| 613136 | * | 8/1994 | (EP) ....................................... 369/48 |
|---|---|---|---|
| 0718831 | * | 6/1996 | (EP) ....................................... 369/54 |

* cited by examiner

*Primary Examiner*—Nabil Hindi
(74) *Attorney, Agent, or Firm*—Pitney, Hardin, Kipp & Szuch LLP (57) ABSTRACT

An information recording apparatus includes: a unit for applying a predetermined processing to record information divided into error correction units and generating processed record information including a plurality of record units; and a unit for recording the processed record information on an information record medium; a unit for recording, after the recording of the processed record information, predetermined dummy information of an information amount corresponding for the plurality of record units, on the information record medium, subsequent to the processed record information recorded.

18 Claims, 7 Drawing Sheets

FIG. 7

INFORMATION RECORDING METHOD AND APPARATUS WITH ADDITIONAL RECORDING FUNCTION

BACKGROUND OF THE INVENTION

1. Field of the Invention

The present invention is related with an information recording method and apparatus for adding and recording new record information subsequent to old record information recorded previously on a recordable information record medium, such as a high-density optical disc and the like, represented by DVD-R (DVD-Recordable) on which the information can be recorded only once.

2. Description of the Related Art

Generally, in the recordable information record medium on which the information can be recorded only once, when it is tried to later overwrite the new record information to an area on which the old record information has once been recorded, both the old record information and the new record information may be broken.

In the information recording method and apparatus for adding and recording the new record information to this kind of the recordable information record medium, when recording the new record information subsequent to the old record information, a linking area (or a boundary area) corresponding to an information amount of a single error correction unit, such as an ECC (Error Correcting Code) block and the like according to the error correcting system used therein, was conventionally provided at the linking or boundary portion of the old record information and the new record information. In the linking area, a meaningless dummy information or a predetermined RF (Radio Frequency) signal is recorded at a last portion of the old record information or a first portion of the new record information, and then the new record information is recorded thereon.

The reason why this linking portion is provided is as follows. If the linking portion is not provided, at the time of consecutively reproducing the new record information, recorded later, as well as the old record information, the RF signal may be discontinuous at the boundary of the record area of the old record information and the record area of the new record information, thereby resulting in an unstable focus servo or tracking servo control.

The reasons why the linking portion is provided for the data capacity corresponding to one ECC block is and why the meaningless dummy information or the like is recorded there in are explained below. In the conventional error correcting process, the error correction is performed by each error correction unit. If the new record information is recorded from the middle of the error correction unit, the appropriate error correction can not be performed for a head portion of the new record information, at the time of consecutively reproducing the old record information and the new record information later. Thus, the appropriately continuous reproduction can not be performed. In this regard, if the meaningless dummy information or the predetermined RF signal is recorded for one ECC block within the linking area as mentioned above, it is possible to reproduce the old record information and the new record information continuously by skipping the linking area and reproduce the new record information from an ECC block next to the linking portion, even though the overlapped portion of the old record information and the new record information in the linking portion is broken.

Further, another reason why the linking area is provided is as follows. If the new record information is recorded to follow the old record information without providing the linking area, both of the old record information and the new record information may be broken at the overlapped portion of them. In that case, if the information broken portion exceeds a single error correction unit, it is impossible to recover the broken record information. For the reasons described above, the linking area is provided at the linking or boundary portion of the old record data and the new record data.

However, the conventional error correction unit has relatively large capacity, for example, approximately 32K bytes, and this area is entirely filled with meaningless information having no relation with the recorded information. Therefore, there is a problem that it results in an extremely ineffective use of the high-density disk or the like, which needs to record a large amount of information.

SUMMARY OF THE INVENTION

The present invention is proposed from the viewpoint of the above mentioned problems. It is therefore an object of the present invention to provide an information recording method and apparatus, which can add and record new record information with effectively utilizing a record area on an information record medium and accurately perform a consecutive and successive reproduction of old record information and new record information.

According to one aspect of the present invention, there is provided an information recording method including the steps of: applying a predetermined processing to record information divided into error correction units and generating processed record information including a plurality of record units; recording the processed record information on an information record medium; and recording, after the recording of the processed record information, predetermined dummy information for an information amount corresponding to the plurality of record units, on the information record medium, subsequent to the processed record information recorded.

In accordance with the method thus designed, a predetermined processing is applied to record information to generate processed record information. Then, the processed record information is recorded on the Iraq information record medium, and dummy information is recorded for the information amount of plural record units, subsequent to the processed record information thus recorded. Therefore, in a case of consecutively reproducing the processed record information, by replacing the reproduced dummy information with pre-set data, it is possible to perform the consecutive reproduction while carrying out the error correction within a range of an error correction capability.

The method may further include the step of overwriting dummy information including the steps of: detecting a head position of an old dummy information previously recorded on the information record medium; and recording new dummy information on the information record medium, based on the detected head position, such that a total information amount of the old dummy information after the recording of the new dummy information and the new dummy information recorded is no more than an information amount of one error correction unit.

In accordance with the method thus designed, a head position of an old dummy information previously recorded on the information record medium is detected. Then, new dummy information is recorded on the information record medium, based on the detected head position, such that a total information amount of the old dummy information after the recording of the new dummy information and the new dummy information recorded is no more than an information amount of one error correction unit.

Further, the processed record information recording step may further include the step of recording new record information on the information recording medium from a position subsequent to the new dummy information recorded. Still further, the dummy information recording step may record the new dummy information over a part of the old dummy information previously recorded.

Thus, the new record information is added and recorded subsequent to dummy information whose content is known in advance. As a result, in a case of consecutively reproducing old record information recorded prior to the old dummy information and the new record information, it is possible to perform the consecutive reproduction while carrying out the error correction within the range of the error correction capability. Since the total information amount of the old dummy information and the new dummy information is no more than that of one error correction unit, within the linking portion of the old record information and the new record information, it is possible to make an area used for recording the record information larger, as compared with the case of providing a linking portion corresponding to one error correction unit. In addition, since the recording area of the old and new dummy information, which may likely be broken due to the overwriting, is smaller than a single error correction unit, the error correction of the neighboring record information is not disturbed. As a result, it is possible to accurately perform the consecutive reproduction.

Alternatively, the processed record information recording step may include the steps of: detecting a head position of the dummy information previously recorded on the information record medium; determining a recording start position from which new record information is recorded on the basis of the detected head position of the dummy information and an information amount in a single error correction block which is a minimum information unit of error correction; calculating an information removal amount corresponding to an information capacity in an area from the head position to the recording start position; removing the record information corresponding to the calculated removal amount from a head of the record information so as to produce an actual record information; and recording the actual record information from the recording start position onto the information recording medium.

In accordance with the method thus designed, an information amount of the new record information at the head portion, which may likely be broken at the time of recording the new record information, is no more than the correction block that is the minimum unit for an error correcting process. Accordingly, it is possible to minimize the deterioration of the error correction performance in consecutively reproducing the old record information and the new record information. As a result, even if there is dust or the like on the information record medium at the time of reproduction, it is possible to achieve reliable error correction performance. Moreover, there is apparently no existence of the linking portion between the old record information and the new record information because the dummy information portion recorded previously and the new record information, which is likely be broken, are restorable by the error correction. As a result, it is possible to make the area used for recording the record information larger, as compared with the case of providing the linking portion corresponding to the entire error correction unit.

Also, the recording start position determining step may determine the recording start position within an area where the dummy information is previously recorded. By this, new record information is recorded subsequent to the dummy information having a content that is known in advance. As a result, it is possible to make the deterioration of the error correction performance smaller, when consecutively reproducing the old record information and the new record information.

According to another aspect of the present invention, there is provided an information recording apparatus including: a unit for applying a predetermined processing to record information divided into error correction units and generating processed record information including a plurality of record units; a unit for recording the processed record information on an information record medium; and a unit for recording, after the recording of the processed record information, predetermined dummy information of an information amount corresponding for the plurality of record units, on the information record medium, subsequent to the processed record information recorded.

The apparatus may further include a unit means for overwriting dummy information including: a unit for detecting a head position of an old dummy information previously recorded on the information record medium; and a unit for recording new dummy information on the information record medium, based on the detected head position, such that a total information amount of the old dummy information after the recording of the new dummy information and the new dummy information recorded is no more than an information amount of one error correction unit.

Still further, the processed record information recording unit may further include a unit for recording new record information on the information recording medium from a position subsequent to the new dummy information recorded. Also, the dummy information recording unit may record the new dummy information over a part of the old dummy information previously recorded.

Alternatively, the apparatus may be so configured that the processed record information recording unit includes: a unit for detecting a head position of the dummy information previously recorded on the information record medium; a unit for determining a recording start position from which the new record information is recorded on the basis of the detected head position of the dummy information; a unit for calculating an information removal amount corresponding to an information capacity in an area from the head position to the recording start position; a unit for removing the record information corresponding to the calculated removal amount from a head of the record information to produce an actual record information; and a unit for recording the actual record information from the recording start position onto the information recording medium. Further, the recording start position determining unit may determine the recording start position within an area where the dummy information is previously recorded.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention are explained with reference to the drawings. The following embodiments explain the embodiments in which the present invention is applied to an information recording apparatus for recording information on a DVD-R.

(I) Embodiment of Record Format

At first, a generally physical format for recording record information on the DVD-R and an error correcting process in the record information are explained with reference to FIGS. 1 and 2.

The error correcting process in the DVD-R of this embodiment and an ECC block, serving as an error correction unit, in the error correcting process are firstly explained with reference to FIGS. 1A and 1B.

Figure 1A:
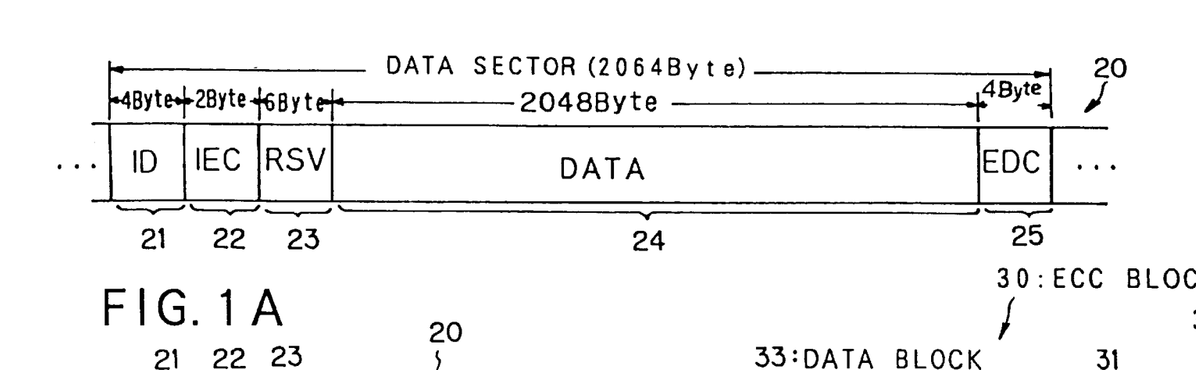
FIG. 1A is a view showing a data structure of record information in an embodiment.

Generally, the record information recorded on the DVD-R has a physical structure including a plurality of data sectors 20 shown in FIG. 1A. One data sector 20 is composed of, from a head portion thereof, an ID information 21 indicative of a start position of the data sector 20, an ID information error correction code (IEC) 22 for correcting errors of the ID information 21, a reserve data 23, a data 24 which is the main data to be recorded, and an error detection code (EDC) 25 for detecting errors in the data 24. The record information to be recorded is constituted by a continuous plurality of the data sectors 20.

Next, process for constituting the ECC block by the data sectors 20 are explained with reference to FIG. 1B.

Figure 1B:
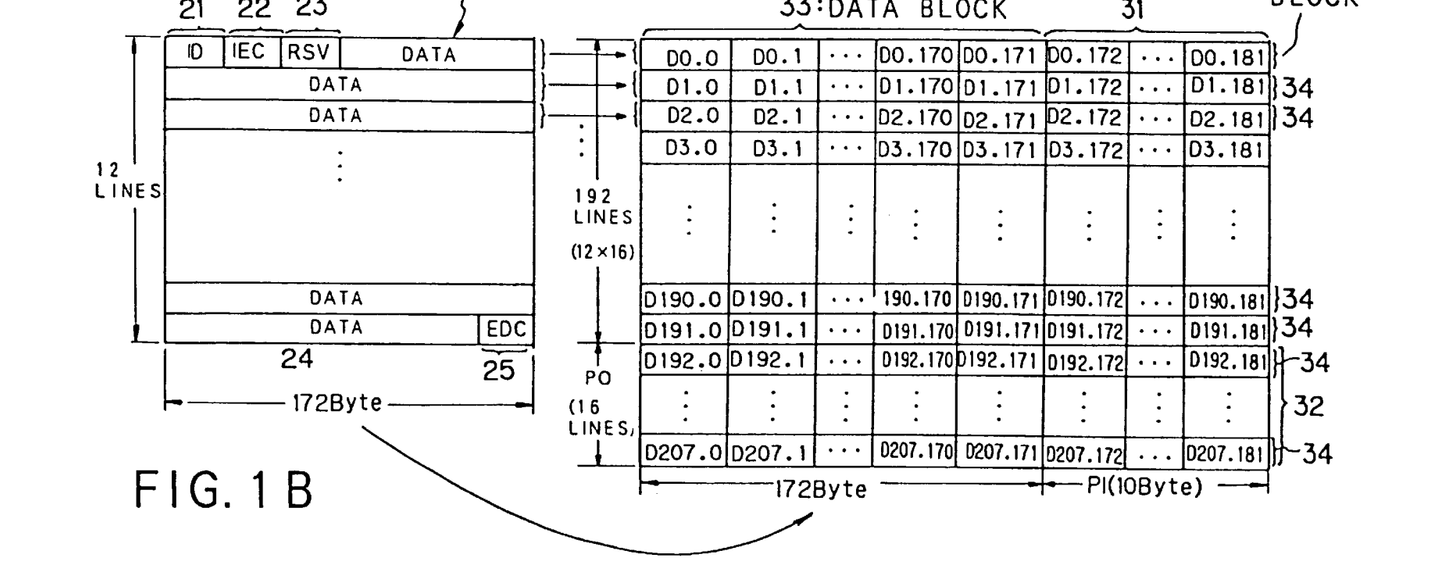
FIG. 1B is a view showing a configuration of an ECC block in the record information of the embodiment.

When constituting an ECC block 30 by the data sectors 20, one data sector 20 is firstly divided into plural blocks each of which is 172 bytes data, as shown in FIG. 1B, and each divided data (this is hereafter referred to as a "data block 33") is arranged in a vertical direction (refer to the left side of FIG. 1B). At this time, the data blocks 33 are arranged in 12 lines in the vertical direction.

For each data block 33 arranged in the vertical direction, ECC internal code (PI (Parity In) sign) 31 having 10 bytes data is affixed to the end of the data block 33 to constitute one correction block 34 (refer to right side of FIG. 1B). At this stage, the correction blocks 34 to which the ECC internal codes 31 are affixed are arranged in 12 lines in the vertical direction. After that, this process is repeated with respect to 16 data sectors 20. Accordingly, the correction blocks 34 of 192 lines are obtained.

Then, the correction blocks 34 of 192 lines are divided in the vertical direction from the beginning thereof, for each one byte, in the state that the 192 lines of the correction blocks 34 are arranged in the vertical direction. 16 ECC external codes (PO (Parity Out) signs) 32 are affixed to each of the vertically divided data blocks. It is noted that the ECC external code 32 is also affixed to a portion of the ECC internal code 31 within the correction block 34.

From the above mentioned process, one ECC block 30 including 16 data sectors 20 is produced as shown in FIG. 1B (right side). At this time, a total amount of the information included within one ECC block 30 is expressed by an equation described below.

(172+10) bytes×(192+16) lines=37856 bytes

The actual data 24 (i.e., other than ECC codes) in it is expressed by an equation described below.

2048 bytes×16=32768 bytes

In the ECC block 30 shown in FIG. 1B, data of one byte is indicated by [D#. *]. For example, [D1. 0] indicates the data of one byte positioned at a first line and a zeroth column, and [D190 . 170] indicates the data of one byte positioned at a 190th line and a 170th column. Thus, the ECC internal codes 31 are positioned at 172nd to 181st columns, and the ECC external codes 32 are positioned at 192nd to 207th lines. The correction blocks 34 are consecutively recorded on the DVD-R.

The reason why the ECC block 30 is constituted so as to include both the ECC internal code 31 and the ECC external code 32, as shown in the right side of FIG. 1B, is that the data arranged in the horizontal direction in FIG. 1B is corrected by the ECC internal code 31 and the data arranged in the vertical direction is corrected by the ECC external code 32. That is, it is possible to perform the error correction in both the horizontal and vertical directions within the ECC block 30 shown in FIG. 1B. Thus, the effective and stable error correction can be performed as compared with the error correcting process used in the conventional CD (Compact Disk) and the like.

More concretely, for example, even if a certain one of the correction blocks 34 (as mentioned above, consecutively recorded on the DVD-R and each totally having the data of 182 bytes including the ECC internal codes 31 for one line) is entirely broken by defect and the like existing on the DVD-R, it is merely the one-byte data break with respect to the ECC external codes 32 at one column, as viewed in the vertical direction. Thus, by carrying out the error correction using the ECC external codes 32 at each column, it is possible to appropriately carry out the error correction to restore the original correct information from the broken information, even though one correction block 34 is entirely broken.

The manner of actually recording on the DVD-R the data sectors 20 included in the ECC blocks 30 shown in FIG. 1B is explained with reference to FIG. 2. In FIG. 2, the data indicated in [D#. *] corresponds to the data described in the right side of FIG. 1B.

Figure 2:
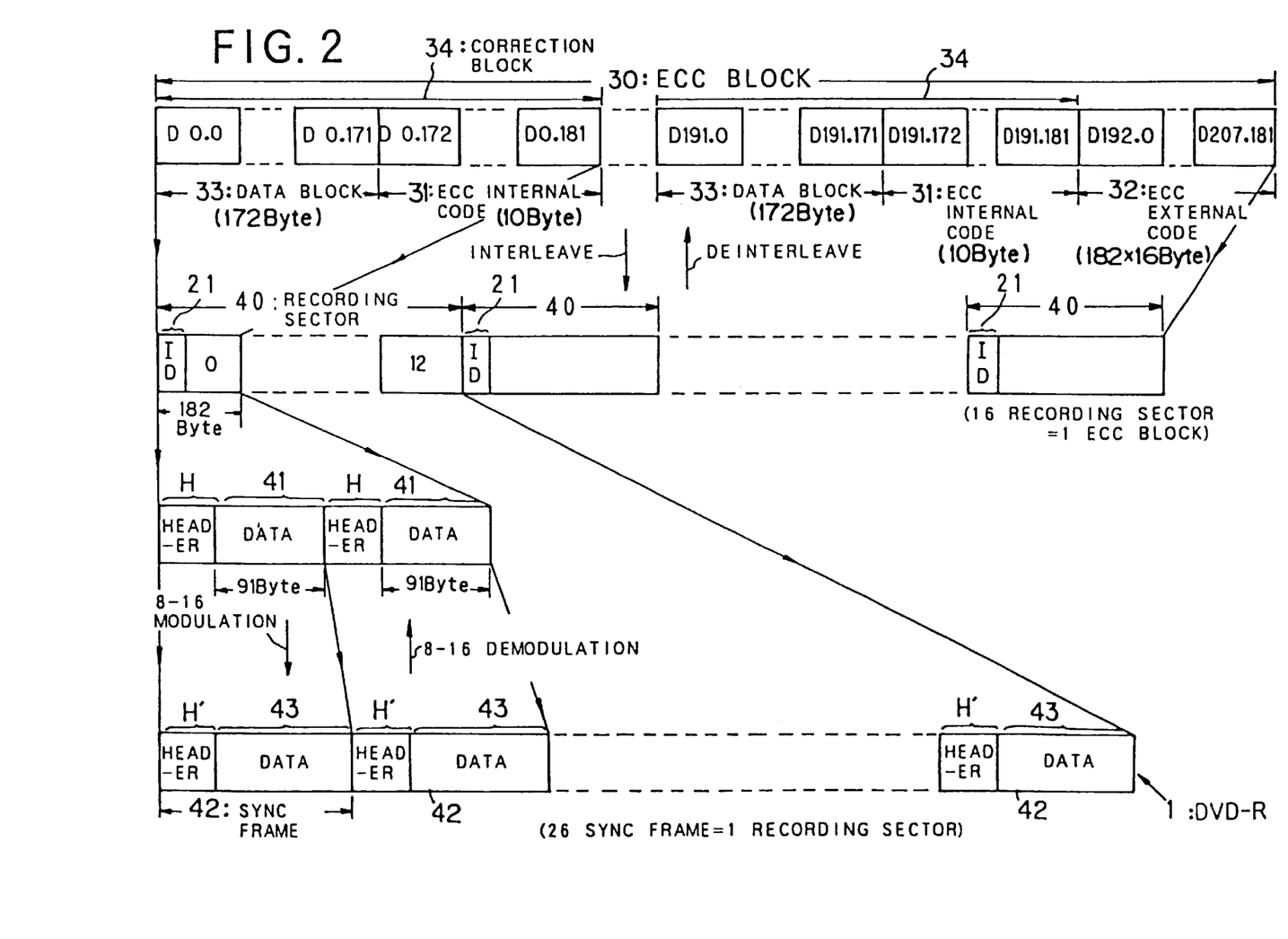
FIG. 2 is a view showing a physical format of the record information of the embodiment.

In recording the ECC blocks 30, on the DVD-R, the ECC blocks 30 are firstly aligned along one line in a horizontal direction for each correction block 34, as shown in a top stage of FIG. 2, and then are interleaved to be divided into 16 recording sectors 40. At this time, one recording sector 40 includes information of 2366 bytes (=37856 bytes/16), and the data sectors 20 and the ECC internal codes 31 and the ECC external codes 32 are included in the manner being mixed with each other in the recording sector 40. However, the ID information 21 (refer to FIG. 1A) in the data sector 20 is positioned at a head portion of each recording sector 40.

The recording sector 40 is divided into a plurality of data 41 each having 91 bytes, and a header H is added to each data 41. After that, one sync frame 42 is produced from one data 41 by 8–16-modulating the recording sector 40 including the pairs of the header H and the data 41. At this time, one sync frame 42 is composed of a header H' and data 43. Further, an information amount within one sync frame 42 is expressed by an equation described below.

$$91 \text{ bytes} \times 8 \times (16/8) = 1456 \text{ bytes}$$

Then, the information is written to the DVD-R 1 in a form of the continuous sync frames 42. At this time, one recording sector 40 includes 26 sync frames 42.

By constituting the above explained physical format to record the information on the DVD-R, the 8–16-demodulation and de-interleave (refer to FIG. 2) are performed at the time of reproducing the recorded information to thereby reproduce the original ECC block 30 and to perform the effective error correction to accurately reproduce the information.

(II) Embodiment of Information Recording Apparatus

Next, an embodiment of an information recording apparatus, in accordance with the present invention, for recording information on the DVD-R 1 according to the physical format explained with reference to FIGS. 1 and 2 is explained with reference to FIGS. 3 to 7. Here, the following assumptions are made in the embodiment described below. That is, in the DVD-R 1, pre-pits carrying address information on the DVD-R 1 and the like are formed in advance on the information tracks, on which the record information is to be recorded. Then, in recording the record information, the address information on the DVD-R 1 is obtained by detecting the pre-pits. By this, a record position on the DVD-R 1 where the record information is to be recorded is detected, and then the record information is recorded.

A configuration of the information recording apparatus in accordance with the present invention is firstly explained with reference to FIG. 3.

Figure 3:
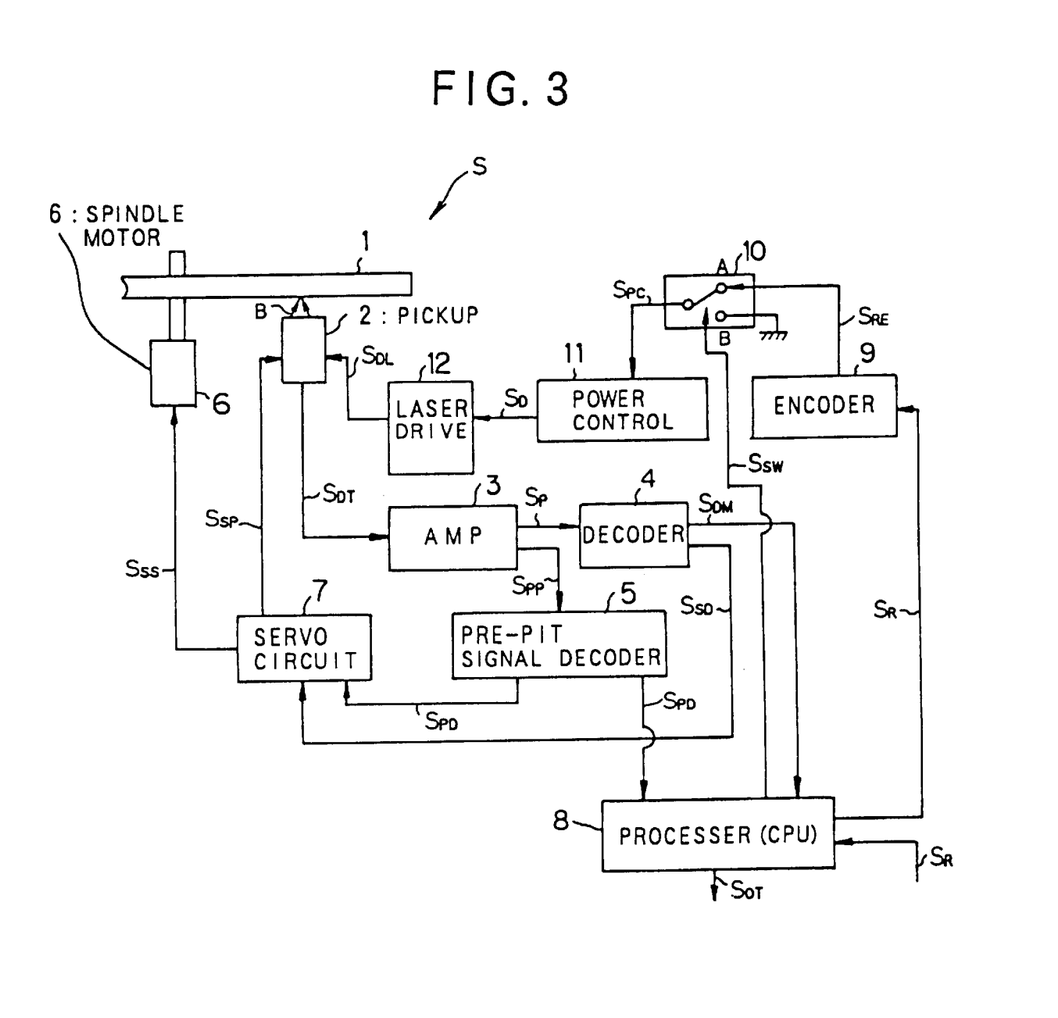
FIG. 3 is a block diagram showing a schematic configuration of an information recording apparatus according to the present invention.

As shown in FIG. 3, an information recording apparatus S of the embodiment is provided with a pick-up 2, a reproduction amplifier 3, a decoder 4, a pre-pit signal decoder 5, a spindle motor 6, a servo circuit 7, a processor 8, an encoder 9, a switch 10, a power control circuit 11 and a laser drive circuit 12.

Next, a whole operation is explained.

The pick-up 2 includes a laser diode, a deflection beam splitter, an objective lens, light detectors and the like (not shown), and irradiates a light beam B onto the information record surface of the DVD-R 1 on the basis of a laser drive signal $S_{DL}$, and detects the pre-pits on the basis of a reflected light thereof to thereby record the record information. Moreover, in a case of the existence of old record information that has already been recorded, the pick-up 2 detects the old record information on the basis of the reflected light of the light beam B.

Then, the reproduction amplifier 3 amplifies a detection signal $S_{DT}$ including the pre-pits outputted by the pick-up 2 and the information corresponding to the old record information that has already been recorded, outputs a pre-pit signal $S_{PP}$ corresponding to the pre-pits, and also outputs an amplification signal $S_P$ corresponding to the old record information.

After that, the decoder 4 applies the 8–16-demodulation and the interleave to the amplification signal $S_P$ to thereby decode the amplification signal $S_P$ and then outputs a demodulation signal $S_{DM}$ and a servo demodulation signal $S_{SD}$.

On the other hand, the pre-pit signal decoder 5 decodes the pre-pit signal $S_{PP}$ to thereby output the demodulation pre-pit signal $S_{PD}$.

The servo circuit 7 outputs a pick-up servo control signal $S_{SP}$ for focus servo control and tracking servo control in the pick-up 2, on the basis of the demodulation pre-pit signal $S_{PD}$ and the servo demodulation signal $S_{SD}$, and also outputs a spindle servo signal $S_{SS}$ for servo-controlling the rotation of the spindle motor 6 for rotating the DVD-R 1.

Along with this, the processor 8 temporally stores and outputs a record information signal $S_R$ corresponding to the record information that is inputted from an external portion, and also outputs to the external a reproduction signal $S_{OT}$ corresponding to the old record information on the basis of the demodulation signal $S_{DM}$, and further outputs a switch signal $S_{SW}$ described later, on the basis of the demodulation pre-pit signal $S_{PD}$.

The encoder 9 affixes the ECC internal code 31 and the ECC external code 32 to the record information signal $S_R$ to thereby constitute the ECC block 30, and also applies the interleave and the 8–16-modulation to the ECC block 30 to thereby output an encode signal $S_{RE}$.

At this time, the switch 10 switches between the encode signal $S_{RE}$ and a ground signal to thereby output as an output signal $S_{PC}$.

Then, the power control circuit 11 outputs a drive signal $S_D$ for controlling an output of the laser diode (not shown) within the pick-up 2 on the basis of the output signal $S_{PC}$.

After that, the laser drive circuit 12 actually drives the laser diode on the basis of the drive signal $S_D$ to thereby output a laser drive signal $S_{DL}$ for emitting the light beam B.

Further, the information recording apparatus S may reproduce the information recorded on the DVD-R 1. In that case, the reproduction signal $S_{OT}$ is outputted to the external through the processor 8 on the basis of the demodulation signal $S_{DM}$.

An operation for finishing the recording of record information and an operation for starting the additional recording of new record information, according to the present invention, are explained with reference to FIGS. 4 to 7, with classifying the cases.

(III) First Embodiment of Information Recording Operation

The first embodiment of the recording operation of the record information is firstly explained with reference to FIGS. 4 and 5.

In the information recording operation of the first embodiment, when the recording of old record information (hereinafter referred to as "old data") is finished, old dummy information (hereinafter referred to as "old dummy data") 44 having an information amount corresponding to two sync frames 42 is recorded, with an ID information 21 at a head portion, subsequent to the old data. When the additional recording of new record information (hereinafter referred to as "new data") is started, new dummy information (hereinafter referred to as "new dummy data") 45 having the same content as the old dummy data 44 is firstly recorded (i.e., overwritten) on an area corresponding to the second sync frame 42 of the areas on which the old dummy data 44 is previously recorded. At this time, a data amount of the new dummy data 45 is determined in such a way that a total data amount of the remainder of the old dummy area after the additional recording of the new dummy data 45 and an area of the new dummy data 45 is equal to or less than the data amount of a single recording sector 40. After that, the new data which is to be primarily recorded is recorded subsequent to the new dummy data 45.

Figure 4:
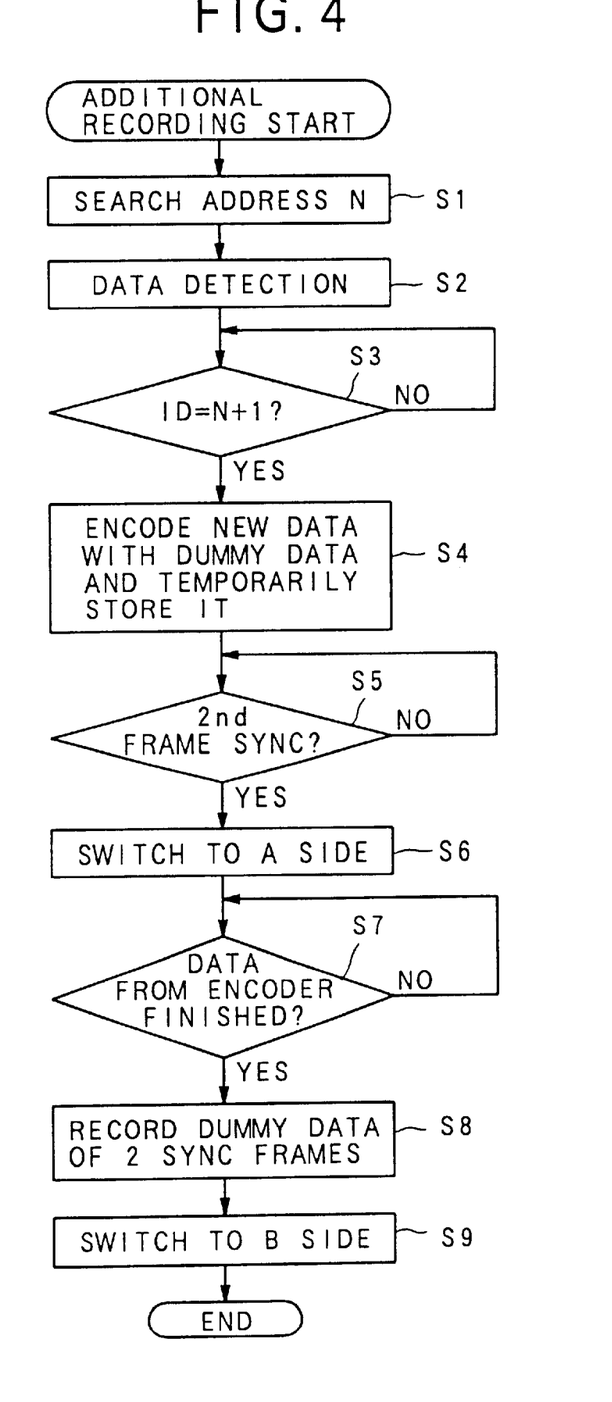
FIG. 4 is a flow chart showing a process according to a first embodiment of an information recording operation.

FIG. 4 is a flow chart indicating the process of additionally recording information on the DVD-R. FIG. 5 shows the information recording manner of the DVD-R 1 before and after the new data is recorded, according to the first embodiment of the information recording operation.

Figure 5:
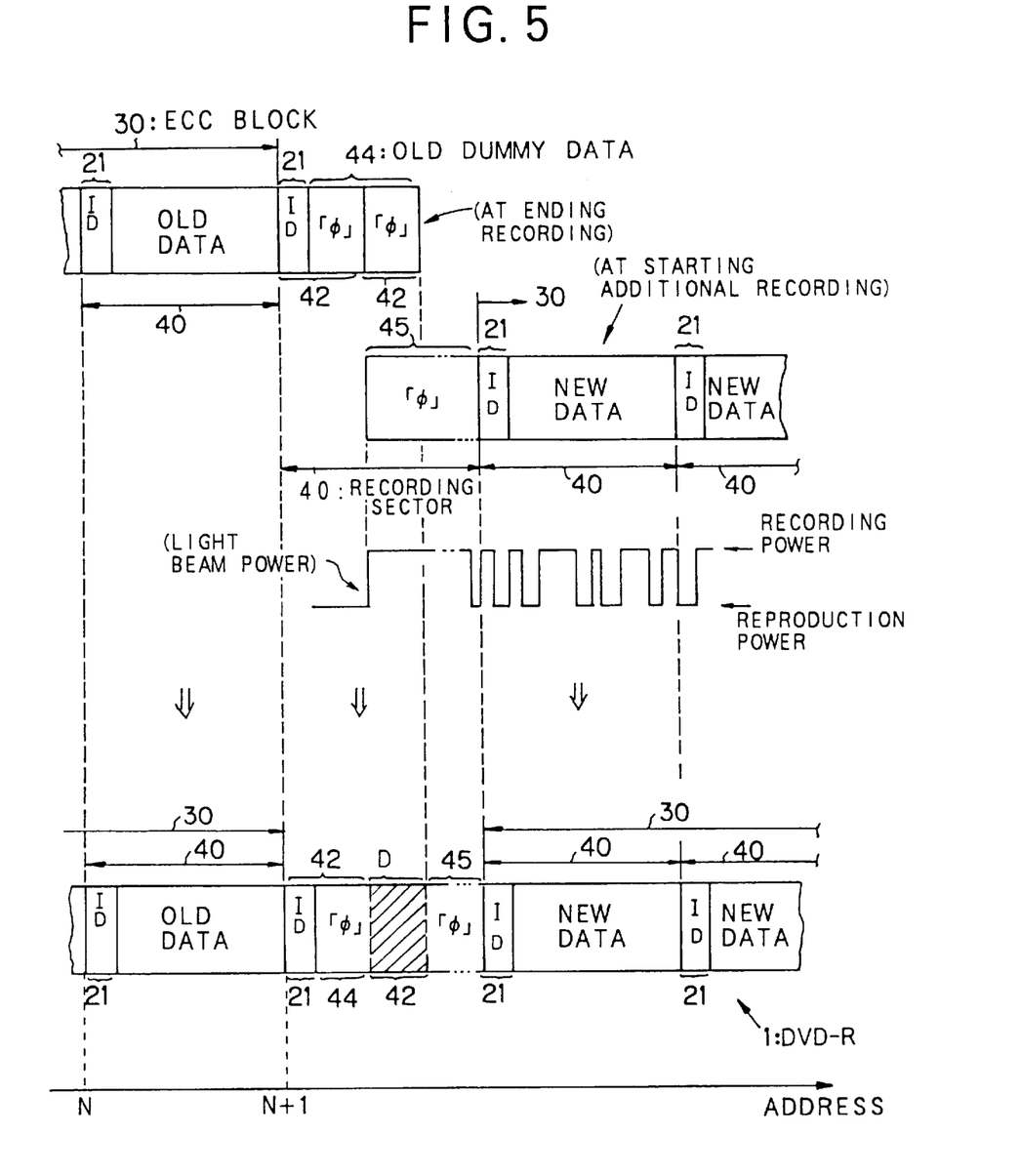
FIG. 5 is a view explaining the recording manner of the record information by the process of the first embodiment.

In FIGS. 4 and 5, it is assumed that the ID information 21 in the final recording sector 40 of the old data is recorded at the address N, and that the ID information 21 in the recording sector 40 of the old dummy data 44 is recorded at the address (N+1).

In the first embodiment of the information recording operation, as shown in FIG. 4, when the additional recording of the new data is started, the address N corresponding to the ID information 21 in the recording sector 40 of last old data is searched (Step S1). This operation is performed by the processor 8, on the basis of the demodulation signal $S_{DM}$ supplied from the decoder 4.

When the ID information 21 corresponding to the address N is detected, the old data recorded on a recording sector 40 subsequent to the detected ID information 21 is detected (Step S2). Then, it is judged by the processor 8, on the basis of the demodulation signal $S_{DM}$ from the decoder 4, whether or not the ID information 21 corresponding to the address (N+1) is detected (Step S3). If the ID information 21 corresponding to the (N+1) is not detected yet (Step S3; NO), the detection of the old data is continued until it is detected. If it is detected, (Step S3; YES), the new dummy data 45, which contents is [0000 . . . ], for example, having an information amount corresponding to:

(one recording sector–one sync frame)

is supplied from the processor 8 to the encoder 9 to be temporarily stored therein. Then, a record information signal $S_R$ corresponding to new record information to be recorded subsequent to the new dummy data 45 is supplied to the encoder 9, which encodes it and temporarily stores the encoded data therein (Step S4).

At this time, an ECC block 30 for the new data may include the new dummy data 45, or may not include it, i.e., the ECC block 30 for the new data begins from an end position of the new dummy data 45 and is composed of only new data.

Next, old dummy data 44 (for example, [0000 . . . ]) recorded subsequent to the ID information 21 corresponding to the address (N+1) is detected, and header H at the head portion of each sync frame 42 is detected on the basis of the demodulation signal $S_{DM}$ supplied from the decoder 4. Then, it is judged by the processor 8 whether or not the area corresponding to a second sync frame 42 is detected in the area of the old dummy data 44 (Step S5). If the area corresponding to the second sync frame 42 is not detected yet (Step S5; NO), the detection of the old dummy data 44 is continued until it is detected. If it is detected (Step S5; YES), the switch 10 is changed over to the terminal A side thereof, on the basis of the switch signal $S_{SW}$ from the processor 8. By this, the new dummy data 45 temporarily stored in the encoder 9 and new data subsequent thereto are read out as the encode signal $S_{RE}$, and then are outputted as the output signal $S_{PC}$ via the switch 10 (Step S6). Accordingly, the new dummy data 45 and the new data subsequent thereto are recorded on the DVD-R 1 by means of the light beam B emitted from the pick-up 2.

The power of the light beam B is maintained to be a constant reproducing power, until the switch 10 is changed over to the terminal A side, as shown in FIG. 5. After the switch 10 is changed over to the terminal A side (on and after the position corresponding to the head portion of the second sync frame 42 in the area of the old dummy data 44), the power of the light beam is repeatedly switched between the recording power and the reproducing power in correspondence with the contents of the new dummy data 45 included in the output signal $S_{PC}$ and the new data subsequent thereto.

The reason why the emission of the light beam B is continuously kept at the reproducing power even when the data is not recorded is that the reflected light used for the tracking servo control is required in order to permit the light beam B to trace the information track on the DVD-R 1, even if the data is not recorded there.

At the step 6, when the switch 10 is changed over to the terminal A side and thereby the new dummy data 45 and the new data are recorded, it is judged by the processor 8 whether or not the new data from the encoder 9 ends (Step S7). If it does not end (Step S7; NO), the recording of the new data is continued while maintaining its original state. If the new data ends (Step S7; YES), the dummy data (for example, [0000 . . . ]) having an information amount corresponding to two sync frames 42 is outputted by the encoder 9 and recorded subsequent to the last new data (Step S8). When the recording of the dummy data is finished, the switch 10 is changed over to the terminal B side (i.e., the ground side), and the power of the light beam B is changed to the reproducing power (Step S9). By this, the additional recording process for the new data is completed.

In the above mentioned process shown in FIG. 4, the new data is recorded subsequent to the new dummy data 45 as shown in FIG. 5. Moreover, when the recording of the new data is finished, the dummy data is recorded, for the information amount corresponding to two sync frames 42, subsequent to the new data thus recorded (the old data in FIG. 5 have been recorded previously by this operation), and then the process is finished. The additional recording of the record information is performed by repeating the above mentioned process. However, in this case, as for the state of the DVD-R 1 at the linking portion between the old data and the new data, the dummy data ([0000 . . . ]) is recorded for the information amount equal to or less than one recording sector 40, as shown in the lowest stage of FIG. 5. Here, in a portion where the old dummy data 44 and the new dummy data 45 are overlapped with each other (this is the information amount corresponding to the one sync frame 42 and indicated as the data broken area D (hatched area) in FIG. 5), both of the old dummy data 44 and the new dummy data 45 may be broken due to the overwriting of the new dummy data 45. However, in the case of consecutively reproducing the old data and the new data later, it is known that the dummy data at a boundary between the old data and the new data is [0000 . . . ], even if the data in the D is broken. Therefore, by replacing the data detected from the data broken area D with the known data [0000 . . . ], it is possible to perform the consecutive reproduction without disturbing the error correction in the consecutive reproduction (without deteriorating the error correcting performance in the consecutive reproduction).

In this embodiment, the dummy data is recorded for the data amount corresponding to at most only one recording sector 40. As a result, it is possible to record more record information by effectively using the recording capacity of the DVD-R 1, as compared with a case of providing a linking area for one ECC block 30 in the conventional manner.

Moreover, the ID information 21 (at the address (N+1)) corresponding to the recording sector 40 positioned at the linking portion between the old data and the new data is never broken because no overwriting is executed on the ID information area 21 (see. address (N+1) in FIG. 5) As a result, it is possible to accurately perform the consecutive reproduction of the recorded information. (IV) Second Embodiment of Information Recording Operation The second embodiment of the recording operation of record information is explained with reference to FIGS. 6 and 7.

In the information recording operation of the second embodiment, similarly to the first embodiment, old dummy data 44 of an information amount corresponding to two sync frames 42 is recorded, with an ID information 21 at the head portion, subsequent to the record information.

On the other hand, at the time of the additional recording of new data, the recording is started from the second sync frame of new data, i.e., new data corresponding to first one sync frame 42 is removed from the beginning of the new data.

Figure 6:
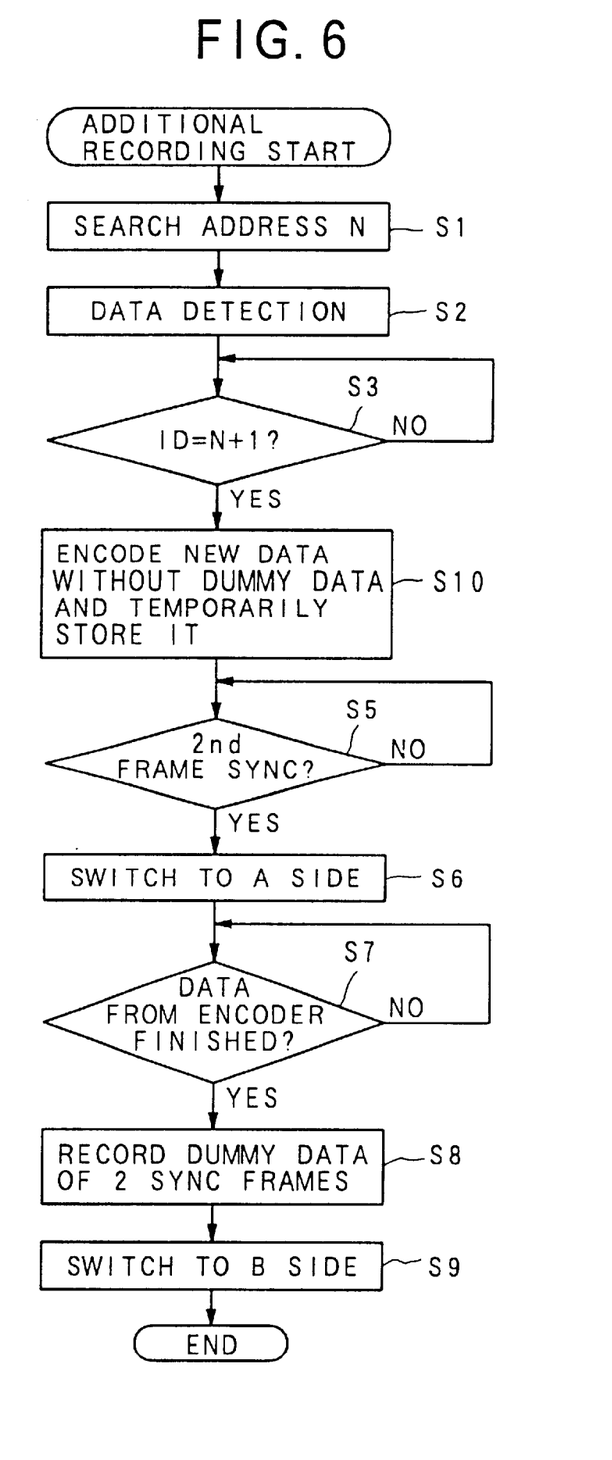
FIG. 6 is a flow chart showing a process according to a second embodiment of the information recording operation.
Figure 7:
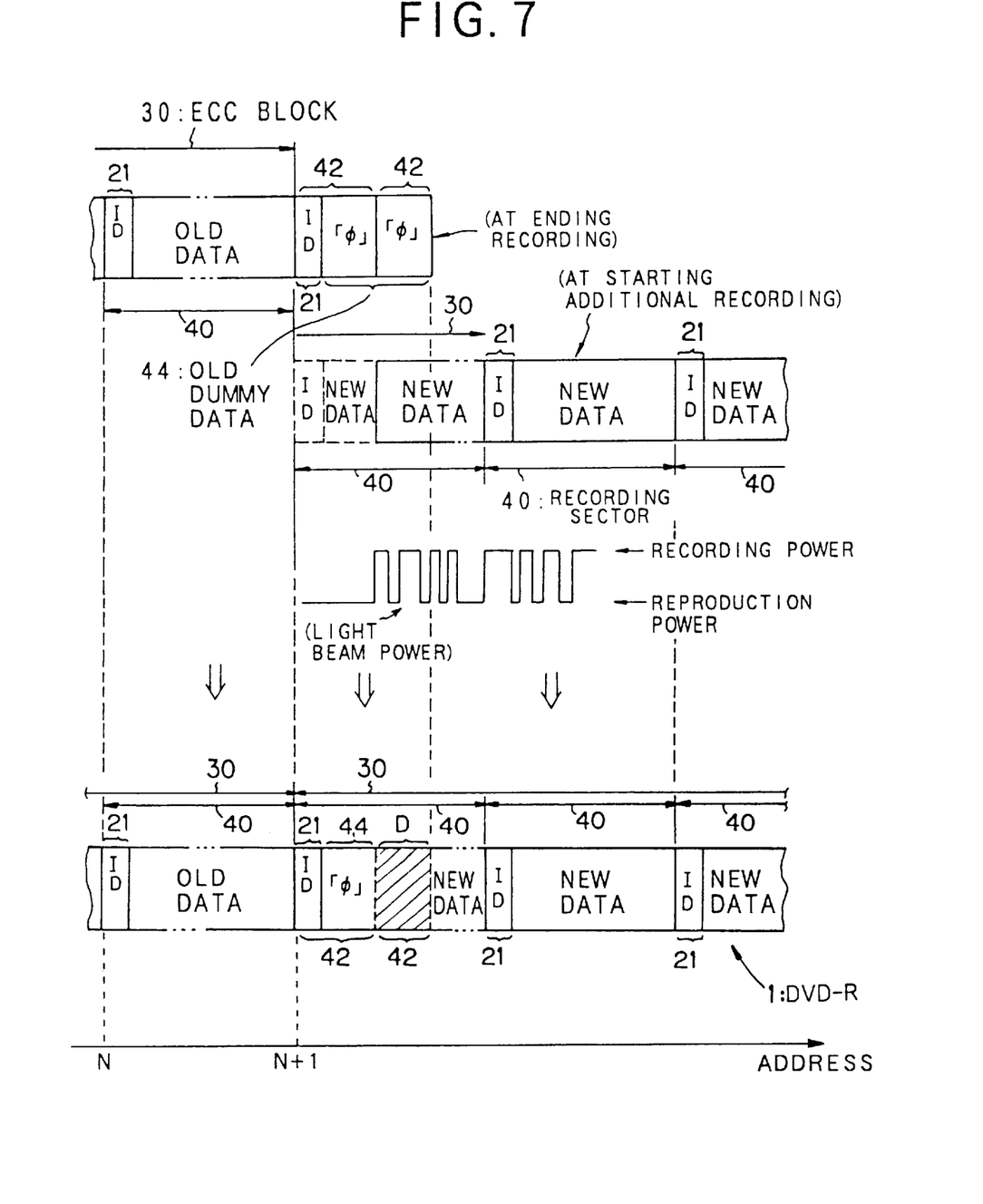
FIG. 7 is a view explaining the recording manner of the record information by the process of the second embodiment.

FIG. 6 is a flow chart indicating the operation of additional recording of the new data after the old data which has already been recorded. FIG. 7 shows the recording manner of the DVD-R 1 before and after the new data is recorded by the second embodiment of the information recording operation.

In FIGS. 6 and 7, it is assumed that the ID information 21 in the final recording sector 40 of the old data is recorded at the address N, and that the ID information 21 in the recording sector 40 of the old dummy data 44 is recorded at the address (N+1). Moreover, the identical step numbers are given to the operations identical to those of the first embodiment of the information recording operation shown in FIG. 4, and the explanation of the detailed portions is omitted for those steps.

In the second embodiment of the information recording operation, as shown in FIG. 6, when the additional recording of the new data is started, the operations identical to the steps S1 to S3 shown in FIG. 4 are firstly executed. Then, the ID information 21 at the head portion of the area of the old dummy data 44 is detected.

If the ID information 21 corresponding to the address (N+1) is detected (Step S3; YES), a record information signal $S_R$ corresponding to the new record information to be recorded is outputted, without inserting the dummy data, from the processor 8 to the encoder 9, which encodes the new data and temporarily stores the encoded data therein (Step S10).

After that, the operations identical to those of the steps S5 to S9 shown in FIG. 4 are executed. New data from the second sync frame (i.e., after new data of first one sync frame 42 is removed from the beginning of the new data) is recorded from the position corresponding to the second sync frame 42 of the area of the old dummy data 44. When the all new data is recorded, dummy data of an information amount corresponding to two sync frames 42 is recorded subsequent to the new data. Then, the recording of the new data ends.

The power of the light beam B is maintained to be a constant reproducing power, until the switch 10 is changed over to the terminal A side, as shown in FIG. 5. After the switch 10 is changed over to the terminal A side (on and after the position corresponding to the head portion of the second sync frame 42 in the area of the old dummy data 44), the power of the light beam is switched between the recording power and the reproducing power in correspondence with the contents of the new dummy data 45 included in the output signal $S_{PC}$ and the new data subsequent thereto.

According to the above mentioned process shown in FIG. 6, at the time of the additional recording of the new data, the recording is performed from the new data of second sync frame, i.e., the new data from which first one sync frame 42 thereof is removed from its beginning, as shown in FIG. 7. Moreover, when the recording of the new data is finished, the dummy data is recorded for the information amount corresponding to two sync frames 42, subsequent to the new data thus recorded (like the manner of old data shown in FIG. 7). In this way, the process is finished. The additional recording of the record information is performed by repeating the above mentioned process.

In this case, as for the state of the DVD-R 1 at a linking portion between the old data and the new data in the additional recording, data different from the new data is recorded in a portion of first two sync frames 42 from the beginning of the new data, as shown in the lowest stage of FIG. 7. That is, the old dummy data 44 is recorded at the first one sync frame 42, and the second sync frame 42 subsequent to it becomes the data broken area D (hatched area). However, in the case of the consecutive reproduction of the old data and new data, since both the ECC blocks of the old data and the new data have the structures of the ECC blocks 30 shown in FIG. 1, the data amount of the two sync frames 42 corresponds to the one correction block 34 in the ECC block 30. Thus, as mentioned in the explanation of the ECC block 30, according to the structure of the ECC block 30 in which the error correction is performed in both the vertical and horizontal directions using the ECC internal code 31 and the ECC external code 32, even if one correction block 34 is entirely broken, it is only the data break of one byte for the ECC external code 32 at one column as viewed in the vertical direction. Therefore, by carrying out the error correction using the ECC external code 32 at each column, it is possible to appropriately carry out the error correction for the two sync frames 40 (i.e., one correction block 34) to thereby perform the accurate reproduction. As a result, the consecutive reproduction can be performed without having substantial influence on the error correction.

Further, the total data amount of the dummy data area and the data broken area D is at most equal to two sync frames 42, this may not put any substantial influence on the error correction in the consecutive reproduction. Therefore, the consecutive reproduction can be performed without providing relatively large linking area between the old data and the new data (the dummy area becomes a meaningless area in the consecutive reproduction of the old data and the new data). As a result, it is possible to record more information by effectively utilizing the record area on the DVD-R 1, as compared with the case of providing the linking area corresponding to one ECC block 30 in the conventional manner.

Further, the second embodiment provides more improved use of data capacity of the DVD-R 1, compared with the first embodiment. In the first embodiment, the dummy data is recorded in first one recording sector 40 beginning from the address (N+1), and hence one recording area 40 is used entirely in vain (see. FIG. 5, lowest stage). In contrast, according to the second embodiment, the recording sector 40 beginning from the address (N+1) is recorded with new data, and even though the data brake takes place there, the broken data can be corrected by the ECC function as described above. Therefore, no recording sector is vainly filled with dummy data in the second embodiment, and the data recording efficiency is further improved.

Furthermore, the ID information 21 (corresponding to the address (N+1)) in the recording sector 40 at the linking portion of the old data and the new data is never broken because, in either of the first and the second embodiments, no data is overwritten on the ID information 21 at the address (N+1). As a result, the consecutive reproduction is not suffered by the lack or break of the ID information 21, thereby enabling the stable consecutive reproduction.

What is claimed is:

1. An information recording method comprising the steps of:

applying a predetermined processing to record information divided into error correction units and generating processed record information comprising a plurality of record units;

recording the processed record information on an information record medium; and recording, after the recording of the processed record information, predetermined dummy information for an information amount corresponding to the plurality of record units, on the information record medium, subsequent to the processed record information recorded;

wherein said processed record information recording step comprising the steps of:

detecting a head position of the dummy information previously recorded on said information record medium;

determining a recording start position from which new record information is recorded on the basis of the detected head position of the dummy information and an information amount in a single error correction block which is a minimum information unit of error correction;

calculating an information removal amount corresponding to an information capacity in an area from the head position to the recording start position;

removing the record information corresponding to the calculated removal amount from ahead of the record information to be recorded so as to produce an actual record information; and recording the actual record information from the recording start position onto said information recording medium.

2. A method according to claim 1, wherein said recording start position determining step determines the recording start position within an area where the dummy information is previously recorded.

3. An information recording apparatus comprising:

means for applying a predetermined processing to record information divided into error correction units and generating processed record information comprising a plurality of record units;

means for recording the processed record information on an information record medium;

means for recording, after the recording of the processed record information, predetermined dummy information of an information amount substantially corresponding to the plurality of record units, on said information record medium, subsequent to the processed record information recorded;

wherein said processed record information recording means comprising:

means for detecting a head position of the dummy information previously recorded on said information record medium;

means for determining a recording start position from which the new record information is recorded on the basis of the detected head position of the dummy information and an information amount in a single error correction block which is a minimum information unit of error correction;

means for calculating an information removal amount corresponding to an information capacity in an area from the head position to the recording start position;

means for removing the record information corresponding to the calculated removal amount from ahead of the record information to produce an actual record information; and means for recording the actual record information from the recording start position onto said information recording medium.

4. An apparatus according to claim 3, wherein said recording start position determining means determines the recording start position within an area where the dummy information is previously recorded.

5. An information recording method comprising the steps of:

applying a predetermined processing to record information and adding error correction codes including ECC (Error Correction Code) internal codes and ECC external codes to generate processed record information corresponding to error correction blocks, the error correction block comprising a plurality of error correction units, each of the error correction unit being reproducible by using the ECC external codes and the ECC internal codes;

recording the processed record information on an information recording medium;

recording, after recording the processed record information, ID information and predetermined dummy information on the information recording medium subsequent to the processed record information recorded;

detecting the ID information and determining a recording start position within the dummy information based on the detected ID information; and recording new dummy information on the information recording medium from the recording start position such that the new dummy information is overwritten on the previously recorded old dummy information for an information amount less than one error correction unit.

6. The method according to claim 5, wherein the new dummy information recording step comprises the steps of:

recording the new dummy information for an information amount less than one recording sector; and recording new record information subsequent to the new dummy information.

7. A method of reproducing information recorded on an information recording medium by the method according to claim 5, comprising the steps of:

reading the record information;

replacing broken recorded information, resulting from overwriting the new dummy information on the previously recorded old dummy information, with the predetermined dummy information; and outputting the read information including the replaced dummy information.

8. An information recording method comprising the steps of:

applying a predetermined processing to record information and adding error correction codes including ECC (Error Correction Code) internal codes and ECC external codes to generate processed record information corresponding to error correction blocks, the error correction block comprising a plurality of error correction units, each of the error correction unit being reproducible by using the ECC external codes and the ECC internal codes;

recording the processed record information on an information recording medium;

recording, after recording the processed record information, ID information and predetermined dummy information on the information recording medium subsequent to the processed record information recorded;

detecting the ID information and determining a recording start position within the dummy information based on the detected ID information; and recording new record information on the information recording medium from the recording start position such that the new record information is overwritten on the previously recorded old dummy information for an information amount less than one error correction unit.

9. The method according to claim 8, wherein the new record information recording step records the new record information such that the new record information is overwritten on the previously recorded old dummy information for an information amount no more than one sync-frame.

10. An information recording apparatus comprising:

a processing means for applying a predetermined processing to record information and adding error correction codes including ECC (Error Correction Code) internal codes (31) and ECC external codes to generate processed record information corresponding to error correction blocks (30), the error correction block comprising a plurality of error correction units, each of the error correction unit being reproducible by using the ECC external codes and the ECC internal codes;

a first recording means for recording the processed record information on an information recording medium and for recording, after recording the processed record information, ID information and predetermined dummy information on the information recording medium subsequent to the processed record information recorded;

a detecting means for detecting the ID information and determining a recording start position within the dummy information based on the detected ID information; and a second recording means for recording new dummy information on the information recording medium from the recording start position such that the new dummy information is overwritten on the previously recorded old dummy information for an information amount less than one error correction unit.

11. An apparatus according to claim 10, wherein the second recording means comprises:

a means for recording the new dummy information for the information amount less than one recording sector; and a means for recording new record information after the new dummy information.

12. An information apparatus for reproducing information recorded on an information recording medium by an apparatus according to claim 10, comprising:

a means for reading the recorded information;

a means for replacing broken recorded information, resulting from overwriting the new dummy information on the previously recorded dummy information, with the predetermined dummy information; and a means for outputting the read information including the replaced dummy information.

13. An information recording apparatus comprising:

a processing means for applying a predetermined processing to record information and adding error correction codes including ECC (Error Correction Code) internal codes and ECC external codes to generate processed record information corresponding to error correction blocks, the error correction block comprising a plurality of error correction units, each of the error correction unit being reproducible by using the ECC external codes and the ECC internal codes;

a first recording means for recording the processed record information on an information recording medium and for recording, after recording the processed record information, ID information and predetermined dummy information on the information recording medium subsequent to the processed record information recorded;

a detecting means for detecting the ID information and determining a recording start position within the dummy information based on the ID information; and a second recording means for recording new record information on the information recording medium from the recording start position such that the new record information is overwritten on the previously recorded old dummy information for an information amount less than one error correction unit.

14. The apparatus according to claim 13, wherein the second recording means records the new record information such that the new record information is overwritten on the previously recorded old dummy information for an information amount not more than one sync-frame.

15. A method according to claim 5, wherein the step of recording ID information and dummy information records a first and a second dummy information blocks, and the detecting step determines an end of the first dummy information block as the recording start position.

16. A method according to claim 8, wherein the step of recording ID information and dummy information records a first and a second dummy information blocks, and the detecting step determines an end of the first dummy information block as the recording start position.

17. An apparatus according to claim 10, wherein the first recording means records a first and a second dummy information blocks, and the detecting means determines an end of the first dummy information block as the recording start position.

18. An apparatus according to claim 13, wherein the first recording means records a first and a second dummy information blocks, and the detecting means determines an end of the first dummy information block as the recording start position.

* * * * *